(12) United States Patent  (10) Patent No.: US 7,841,777 B2
Howard et al.  (45) Date of Patent: Nov. 30, 2010

(54) ADAPTER WITH DUST SHUTTER

(75) Inventors: Joseph Howard, Hickory, NC (US);
  Myron Yount, Conover, NC (US);
  Darrell Childers, Hickory, NC (US);
  Eric Childers, Hickory, NC (US); David Underwood, Keller, TX (US)

(73) Assignee: U.S. Conec, Ltd., Hickory, NC (US)

( * ) Notice: Subject to any disclaimer, the term of this patent is extended or adjusted under 35 U.S.C. 154(b) by 0 days.

(21) Appl. No.: 12/100,370

(22) Filed: Apr. 9, 2008

(65) Prior Publication Data

US 2009/0185778 A1  Jul. 23, 2009

Related U.S. Application Data

(60) Provisional application No. 61/021,862, filed on Jan. 17, 2008.

(51) Int. Cl.
  *G02B 6/36* (2006.01)

(52) U.S. Cl. .......................................... 385/75; 385/94
(58) Field of Classification Search .................. 385/75, 385/94
  See application file for complete search history.

(56) References Cited

U.S. PATENT DOCUMENTS

| 5,506,922 | A | 4/1996 | Grois et al. | |
| 6,007,353 | A * | 12/1999 | Webster | 439/142 |
| 6,186,670 | B1 * | 2/2001 | Austin et al. | 385/55 |

* cited by examiner

*Primary Examiner*—Jerry T Rahll
(74) *Attorney, Agent, or Firm*—Michael L. Leetzow, P.A.

(57) ABSTRACT

An adapter with a dust shutter also provides eye protection and an even seal around the connector opening. The adapter includes a main body, a cover, and a resilient member to bias the cover in a closed position. The adapter also includes a flexible member to assist in sealing the adapter. The resilient member contacts the cover in a center portion and the cover floats relative to the main body to ensure a good seal.

16 Claims, 10 Drawing Sheets

ADAPTER WITH DUST SHUTTER

CROSS-REFERENCE TO RELATED APPLICATIONS

This application claims priority to and incorporates by reference herein in its entirety the following: U.S. Provisional Patent Application Ser. No. 61/021,862, filed Jan. 17, 2008.

BACKGROUND OF THE INVENTION

1. Field of the Invention

The present invention relates generally to an adapter with a shutter, and particularly to an adapter with a shutter that protects the adapter from accumulating dust and to protect an end user from potential eye-damage if a connector is removed from the adapter.

2. Technical Background

Fiber optic cables are widely used today to transmit a large amount of data rapidly and efficiently. Systems using fiber optic cables typically have multiple connection points, or interfaces, where the light signals must be transmitted from one set of optical fibers to another set of optical fibers. These connection points or interfaces usually involve two connectors that are mechanically and optically aligned to allow the light to traverse the connection points. These connection points typically occur within adapters that mechanically and optically align the fiber optic connectors. Usually, there are many such adapters that are used in a system and not all adapters are used when installed.

The end user of systems typically move connectors on one side of the system to connect or reconnect connectors with one another. Open adapters and the moving of connectors from one adapter to another presents at least two issues for the system and the user. First, if the adapters are open, or even if they are moved, dust may enter the adapter and interfere with the light transmission between two connectors by contaminating the adapter or the connectors. Second, when moving connectors, the connector on the opposite side of the adapter may still be connected to a light source, presenting a potential source of eye damage. There are dust caps for connectors, but they are essentially useless in this situation since the connectors are moved from one adapter to another and they cannot be used to prevent the light from exiting the connector on the back side of the system.

It would be desirable therefore to provide an adapter that has a shutter that remains in place, prevents dust from entering the adapter when a connector is not installed, and prevents eye damage by blocking the light from the connector on the back side of the system.

SUMMARY OF THE INVENTION

Disclosed herein is a fiber optic connector adapter that includes a main body having an opening for receiving a fiber optic connector, a cover for sealing the opening in the main body when a connector is not inserted into the opening, the cover being rotatably connected to the main body, and a resilient member engaging the main body and the cover to bias the cover in a closed position, the resilient member engaging the cover only at a location that generally corresponds to a center portion of the cover.

In some embodiments, the main body has an end face with a radial projection extending around the opening.

In some embodiments, the cover has a recessed area corresponding to the readial projection.

In some embodiments, the cover has an opening in the cover to receive the resilient member.

In another aspect, a fiber optic connector adapter is disclosed that includes a main body having an opening for receiving a fiber optic connector, the main body having an end face and a radial projection on the end face extending around the opening, a cover for sealing the opening in the main body when a connector is not inserted into the opening, the cover being rotatedly connected to the main body, and a resilient member engaging the main body and the cover to bias the cover in a closed position.

In yet another aspect, a fiber optic connector adapter is disclosed that includes a main body having an opening for receiving a fiber optic connector, the main body having an end face and a radial projection on the end face extending around the opening, a cover for sealing the opening in the main body when a connector is not inserted into the opening, the cover being rotatably connected to the main body and having a recessed area corresponding to the radial projection on the end face of the main body, the recessed area having a flexible member to engage the radial projection and seal the opening, and a resilient member engaging the main body and the cover to bias the cover in a closed position, the resilient member engaging the cover only at a location that generally corresponds to a center portion of the cover.

In yet another aspect, a fiber optic connector adapter is disclosed that includes a main body having an opening for receiving a fiber optic connector, a cover for covering the opening in the main body when a connector is not inserted into the opening, the cover being rotatably connected to the main body, a flexible member engaging the main body and the cover when the connector is not inserted into the opening to thereby seal the opening, and a resilient member engaging the main body and the cover to bias the cover in a closed position.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIGS. 1-5, adapter 10 has a main body 12 that has a front end 14 and a rear end 16. The main body also has an opening 18 that extends between the front end 14 and the rear end 16 to receive a connector (not illustrated). Adapter 10 is illustrated in the figures is one portion of a complete adapter. As is known in the art, a second adapter portion (not illustrated) is attached to the rear end 16 to allow another connector to be received for optical and mechanical alignment with the connector inserted into opening 18. The second adapter portion may have any configuration or format, and may even be the same as illustrated in FIGS. 1-4.

The adapter 10, and particularly opening 18, as illustrated in the figures is configured to receive an MTP type connector, but could be configured to accept any appropriate connector form.

The front end 14 of the adapter 10 has a front face 20 that has a radial projection 22 that preferably encircles the opening 18. The radial projection 22 is illustrated as a rib that has a cross section that approximates a triangle. The radial projection 22 also preferably encircles the opening 18 in a form that approximates the opening 18. The radial projection 22 may take any cross section shape or configuration on the front face 20 of the adapter 10 and still be within the scope of the present invention. The projection 22 may also be resilient, such as a gasket or O-ring.

The adapter 10 also includes a cover 30, that is rotatably connected to the main body 12 by a pin 32. The pin preferably passes through two openings 34,36 in the main body 12 adjacent one edge of the front end 14. The openings 34,36 are preferably sized to receive the pin 32 with only minimal clearance.

Figure 1:
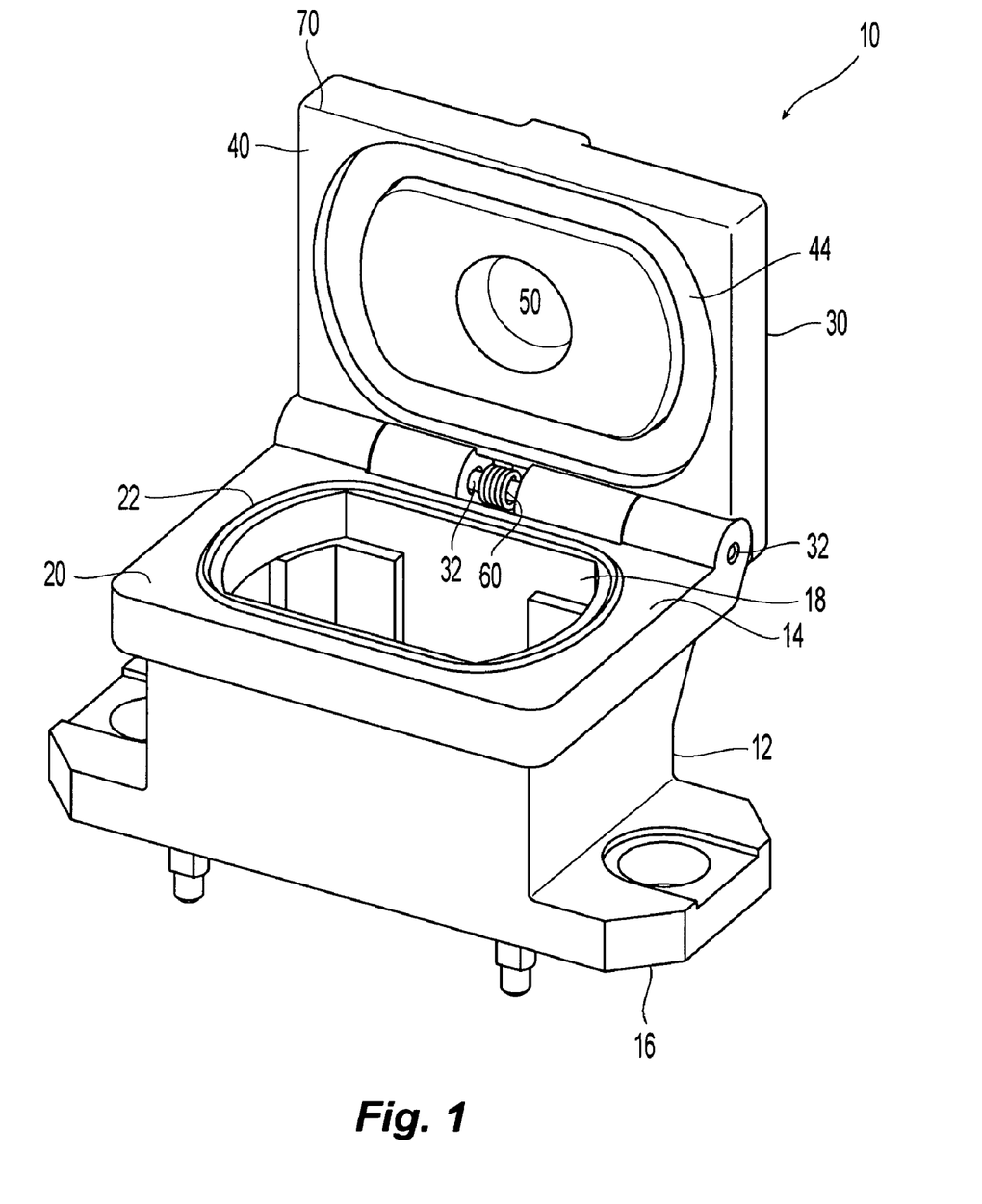
FIG. 1 is a front perspective view of one embodiment of an adapter according to the present invention.
Figure 2:
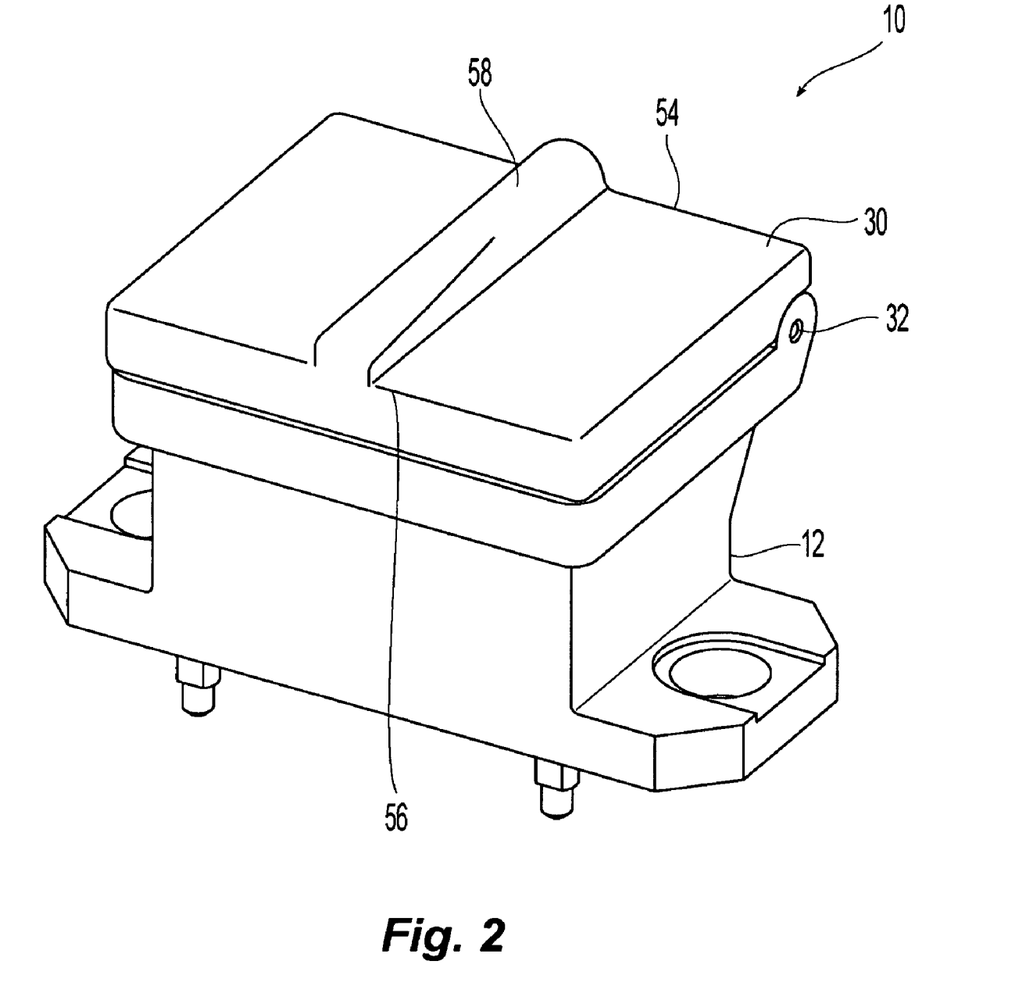
FIG. 2 is a front perspective view of the adapter of FIG. 1 in a closed position.
Figure 3:
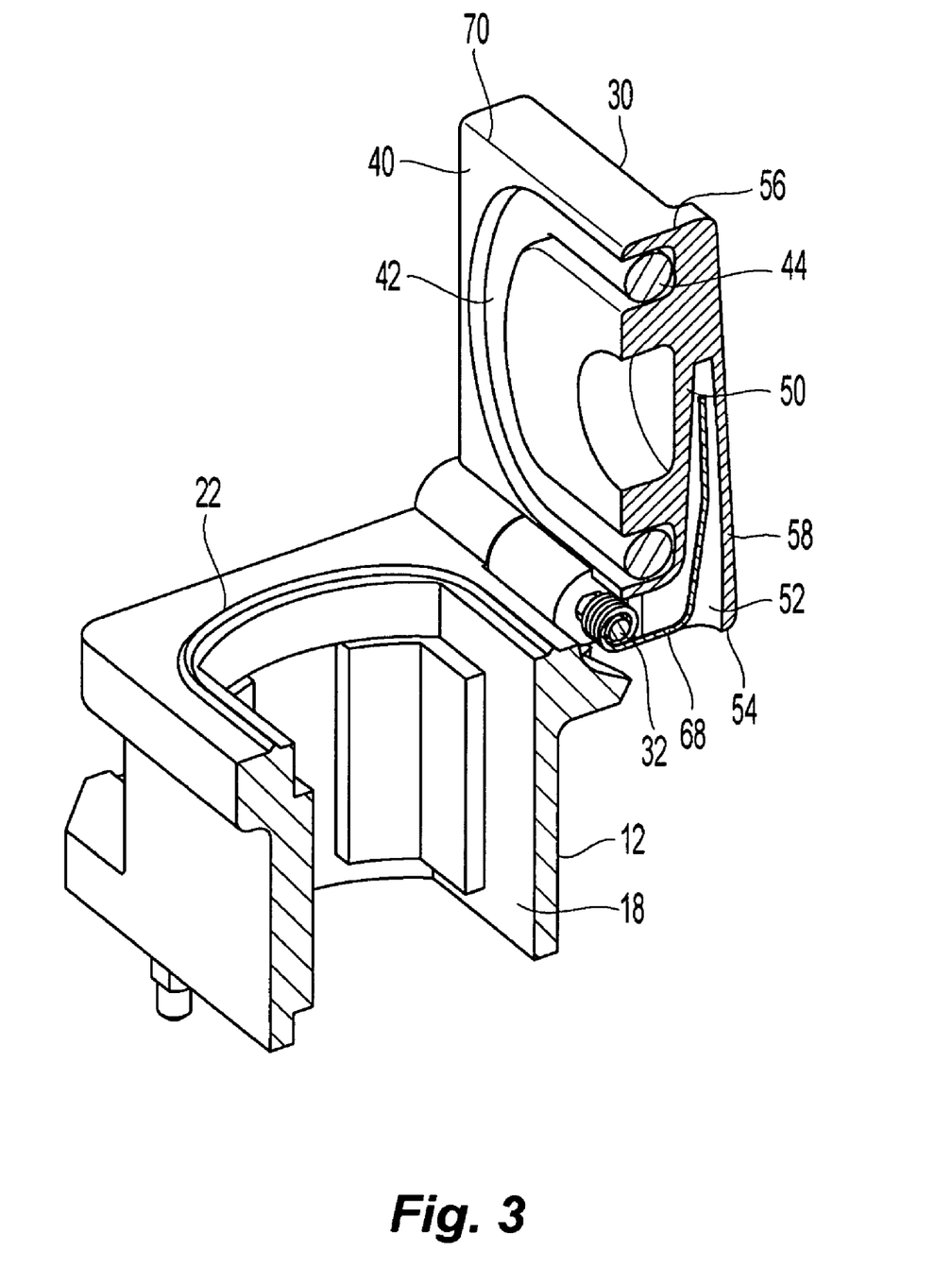
FIG. 3 is cross section view of the adapter of FIG. 1.
Figure 4:
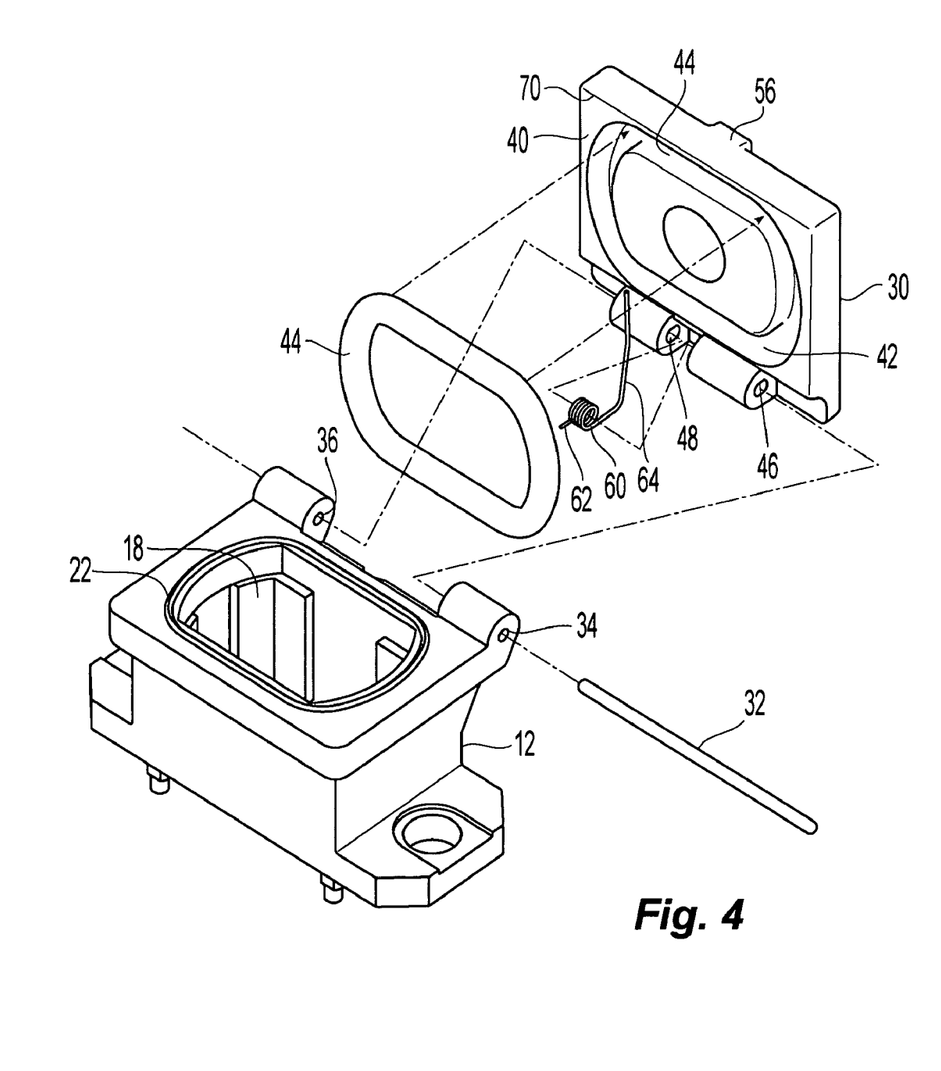
FIG. 4 is an exploded view of the adapter of FIG. 1.

The cover 30 that is preferably sized to correspond to the main body 12, although it may be larger or smaller. The cover 30 has a recessed portion 42 that is configured to correspond to the radial projection 22 on the front face 20 of main body 12. The recessed portion 42 also preferably includes a flexible member 44 that engages the radial projection 22 to provide a tight junction therebetween and keep out any dirt and/or debris. As best illustrated in FIG. 4, the flexible member 44 is an O-ring seal. The flexible member 44 is preferably recessed relative to the inside surface 40 of the cover 30 so that a connector being inserted or removed from the adapter 10 will not catch on the flexible member 44. The presence of the radial projection 22 on the front face 20 allows for a tight seal even with the flexible member 44 being recessed relative to the cover 30. The flexible member 44 and the recessed portion 42 are preferably sized to one another such that the flexible member 44 is frictionally engaged within the recessed portion and need not be epoxied into the recessed portion 42, although it may be.

As noted above, the projection 22 may be resilient or it may be hard. It is also possible that the cover 30 has the projection and the main body 12 has a corresponding recessed portion with a resilient member therein.

The cover 30 also has two pin openings 46,48, through which the pin 32 passes to rotatably attach the cover 30 to main body 12. The pin openings 46,48 are not circular as are pin openings 34,36 on main body 12. Rather, the pin openings 46,48 are elongated to allow the cover 30 to move relative to the pin 32 to ensure a tight fit with the main body 12, as described in more detail below.

The adapter 10 also includes a resilient member 60, which is illustrated as an arm spring. One end 62 of the arm spring 60 engages the main body 12, while the other end 64 engages the cover 30. A central portion of the resilient member 60 is wrapped around the pin 32. As noted above, the end 64 of resilient member 60 engages a center portion 50 of the cover 30. By contacting a center portion 50, and in conjunction with the non-circular pin openings that allow the cover 30 to float on the pin 32, the cover 30 maintains an even pressure on the radial projection 22, keeping the opening 18 sealed. Preferably the resilient member 60 passes into an opening 52 that extends from a top edge 54 of cover 40 toward a bottom end 56. While the opening 52 has a cover 58, the opening need not have a cover and could simply be a groove or depression in the cover 30.

Figure 5:
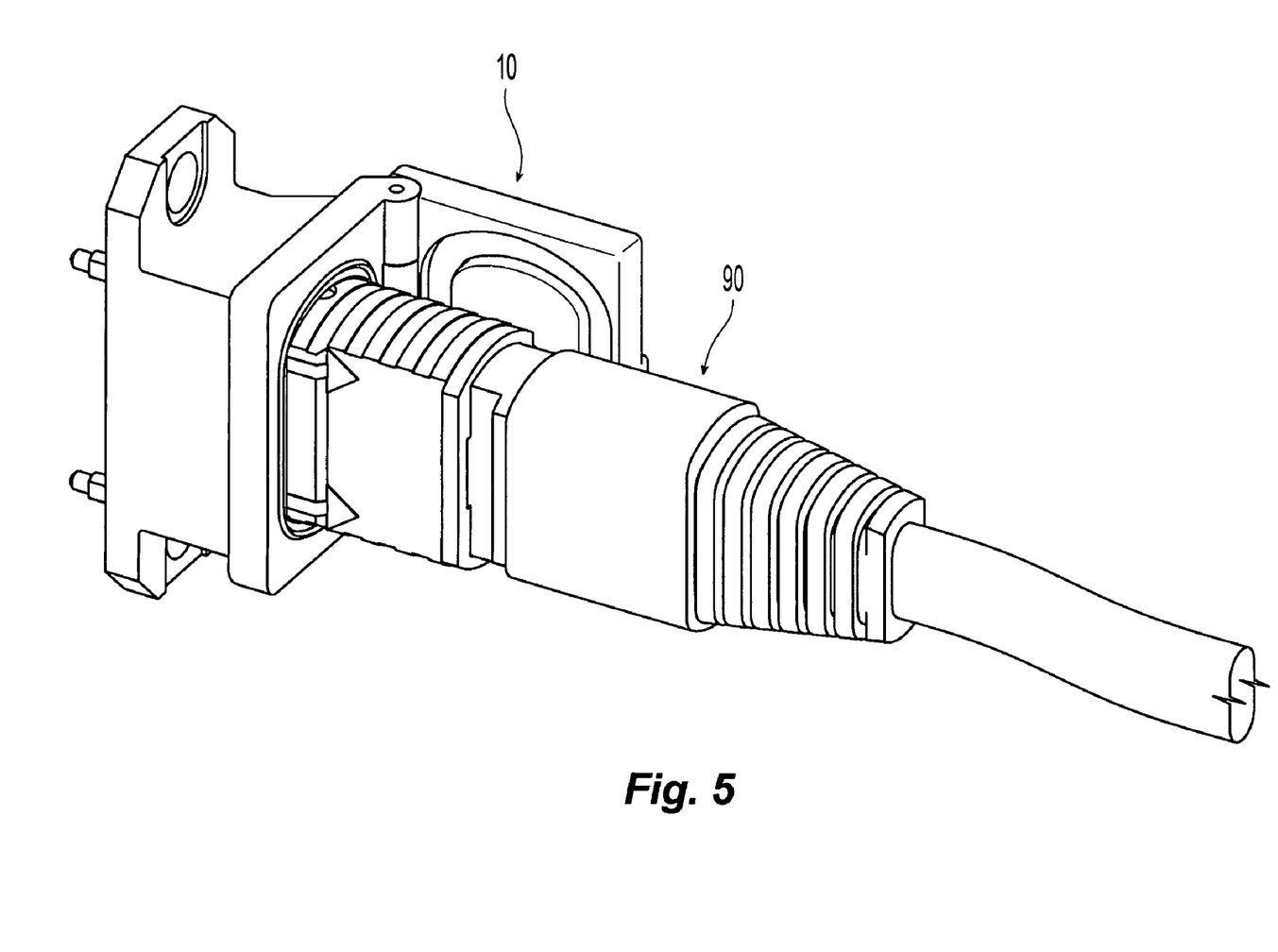
FIG. 5 is a perspective view of the adapter of FIG. 1 with a connector inserted therein.

The cover 30 also preferably has a rounded bottom edge 70 such that the connector will not catch on the cover 30 during insertion or removal of the connector from the opening 18. A perspective view of a connector 90 inserted into the adapter 10 is illustrated in FIG. 5, showing the relative placement of the cover and the connector 90 once inserted into the adapter 10.

Figure 6:
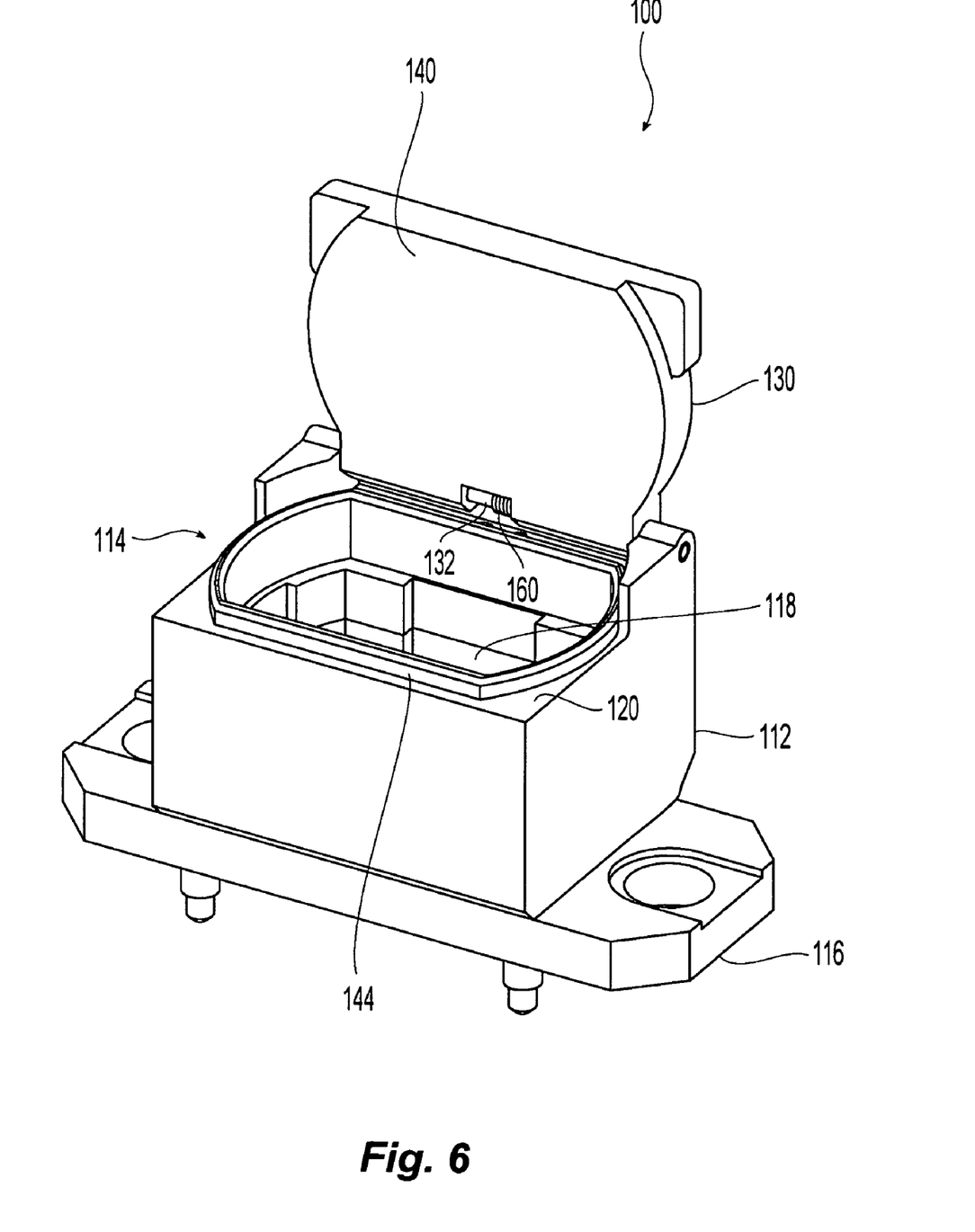
FIG. 6 is a front perspective view of a second embodiment of an adapter according to the present invention.
Figure 7:
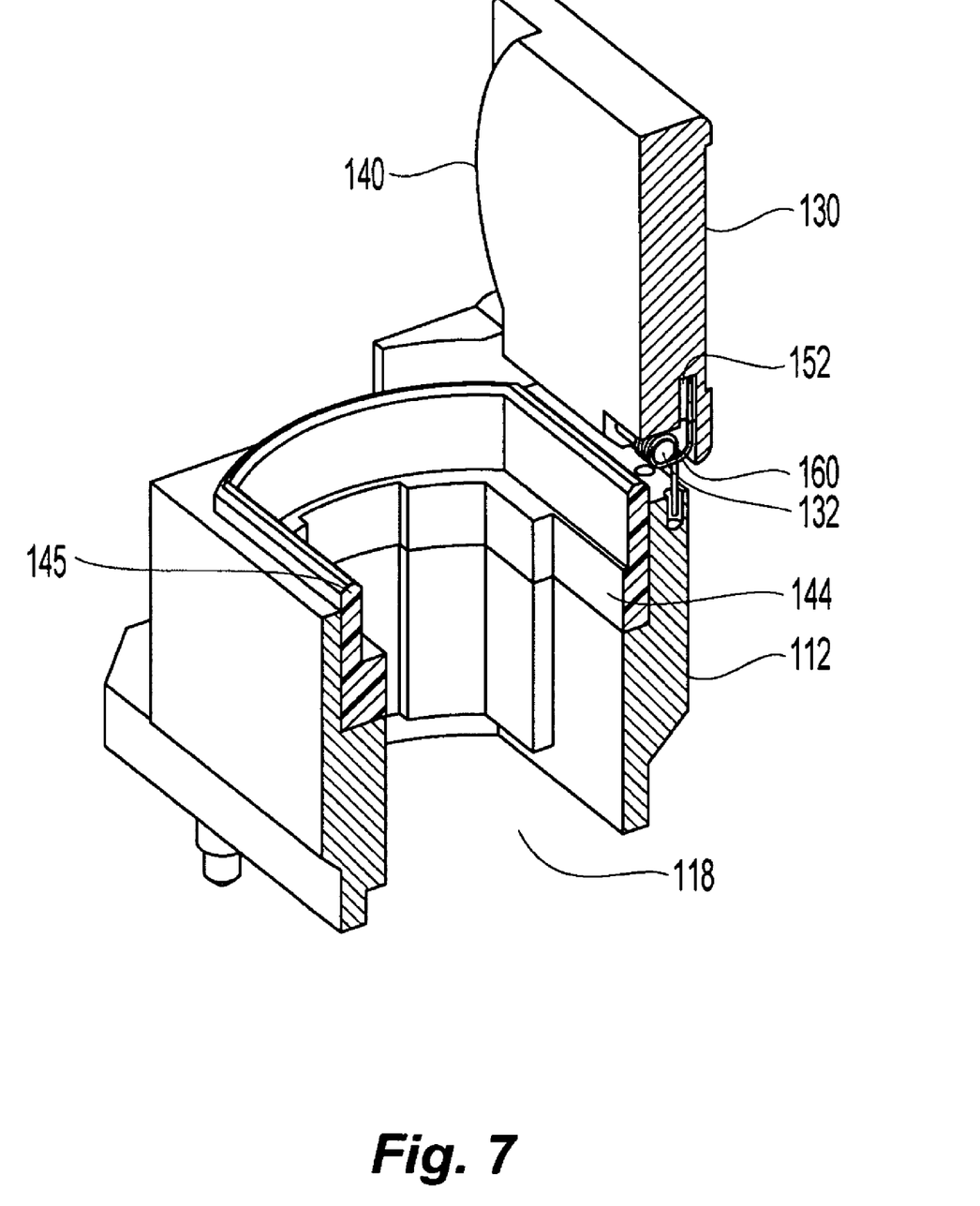
FIG. 7 is a cross section view of the adapter of FIG. 6.
Figure 8:
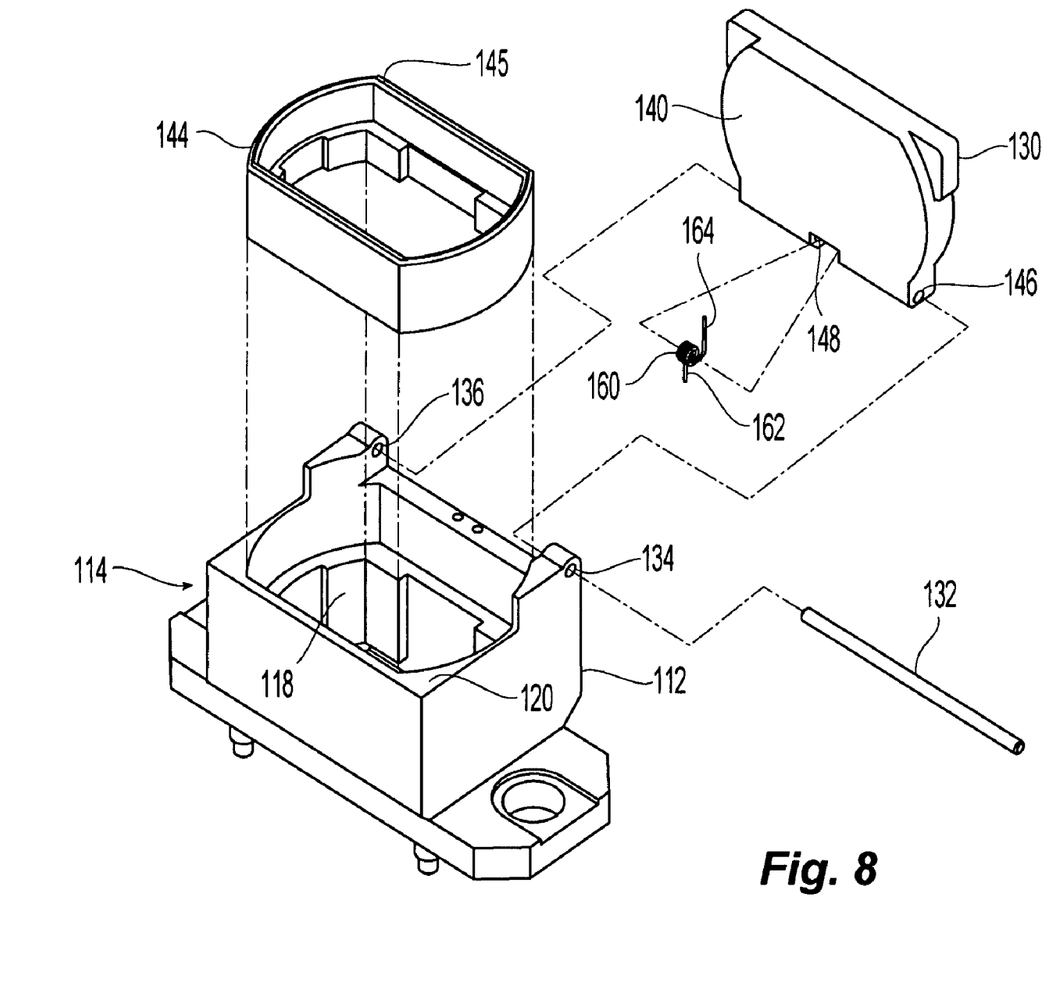
FIG. 8 is an exploded view of the adapter of FIG. 6.
Figure 9:
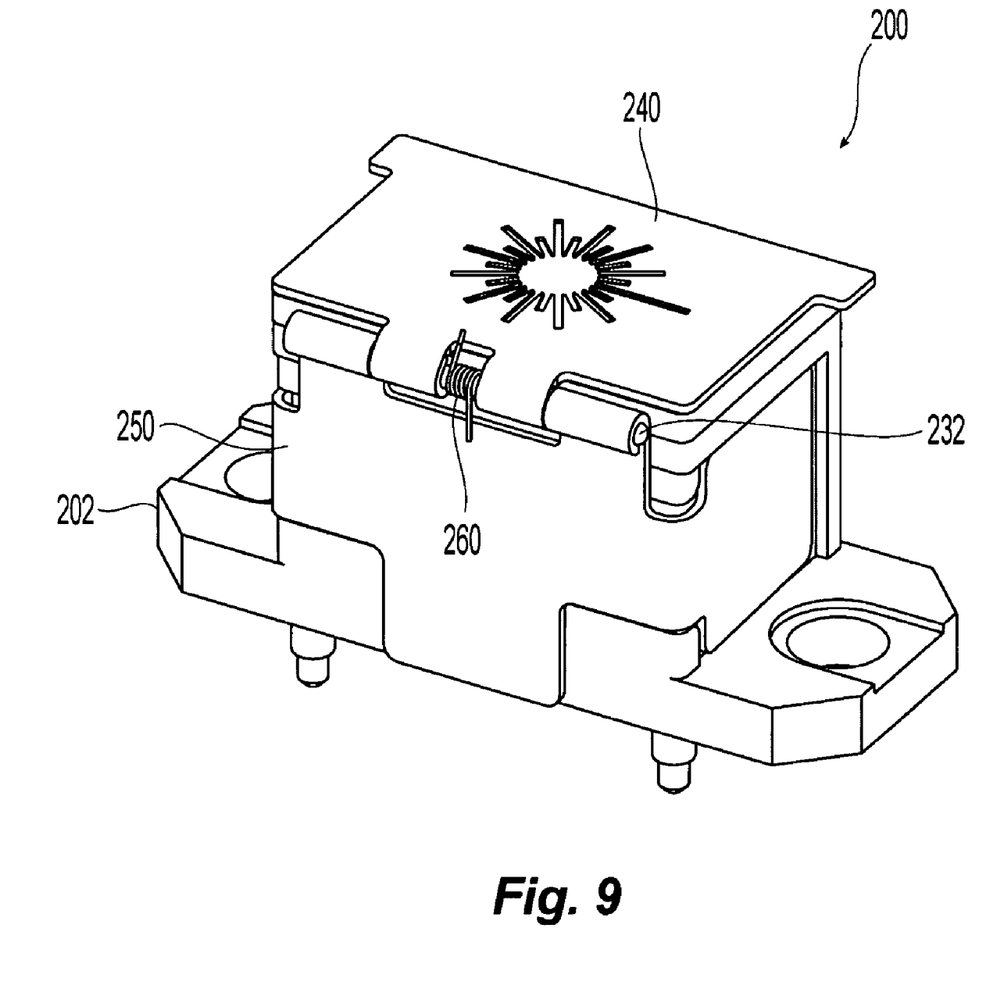
FIG. 9 is a perspective view of a third embodiment of an adapter according to the present invention.
Figures 10, 11, 12:
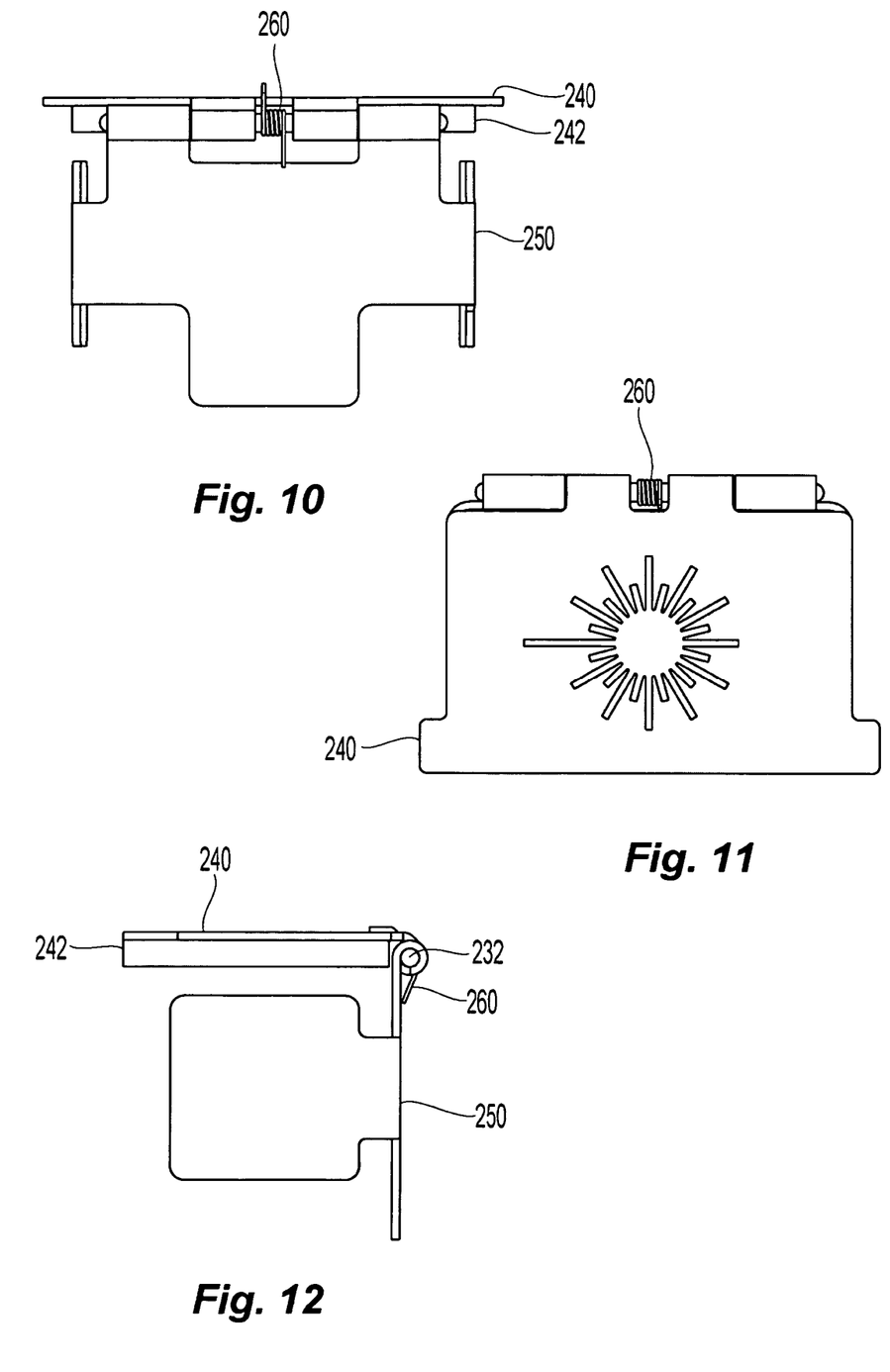
FIG. 10 is a top view of the cover and clip of the adapter of FIG. 9.
FIG. 11 is a side view of the cover and clip of FIG. 9.
FIG. 12 is a front view of the cover and clip of FIG. 9.

A second embodiment of an adapter 100 according to the present invention is illustrated in FIGS. 6-8 and has a main body 112 that has a front end 114 and a rear end 116. The main body also has an opening 118 that extends between the front end 114 and the rear end 116 to receive a connector (not illustrated). Adapter 100 is illustrated in the figures as one portion of a complete adapter. As is known in the art, a second adapter portion (not illustrated) is attached to the rear end 116 to allow another connector to be received for optical and mechanical alignment with the connector inserted into opening 118. The second adapter portion for adapter 100 may have any configuration or format, and may even be the same as illustrated in FIGS. 1-5 or in FIGS. 6-8.

The adapter 100, and particularly opening 118, as illustrated in the figures is configured to receive an MTP type connector, but could be configured to accept any appropriate connector form.

The adapter 100 also includes a cover 130, that is rotatably connected to the main body 112 by a pin 132. The pin preferably passes through two openings 134,136 in the main body 112 adjacent one edge of the front end 114. The openings 134,136 are preferably sized to receive the pin 132 with only minimal clearance.

The cover 130 that is preferably sized to correspond to the main body 112, although it may be larger or smaller. The cover 130 has a flat front face 140 to engage a flexible member 144, described in detail below.

The cover 130 also has two pin openings 146,148, through which the pin 132 passes to rotatably attach the cover 130 to the main body 112. The pin openings 146,148 are not circular as are pin openings 134,136 on main body 112. Rather, the pin openings 146,148 are elongated to allow the cover 130 to move relative to the pin 132 to ensure a tight fit with the main body 112, as described in more detail below.

The main body 112 has a flexible member 144 inserted therein to engage the front face 140 of cover 130. Rather than have a flexible member in the cover 130 as in the prior embodiment, a flexible member 144 is inserted into the main body 112 of the adapter 100. The flexible member 144, as best seen in FIG. 7, is configured along with the remaining interior of the main body 112 so as to accept an appropriate connector. While the flexible member 144 extends about ⅓ of the way from the front end 114 toward the rear end 116, it need not. It could extend more or less from the front end 114. However, the front end 145 of the flexible member 114 preferably extends above the front end 114 of the main body 112 so that it engages the front face 140 of the cover 130 when a connector is not inserted into the opening 118.

The adapter 100 also includes a resilient member 160, which is illustrated as an arm spring. One end 162 of the arm spring 160 engages the main body 120, while the other end 164 engages the cover 130 in opening 152. A central portion of the resilient member 160 is wrapped around the pin 132. The end 164 of resilient member 160 engages cover 130 near an edge. However, the opening 152 and end 164 could both be longer so that end 164 of resilient member 160 engages the center of cover 130 as in the first embodiment. While the opening 152 has a cover 158, the opening 152 need not have a cover and could simply be a groove or depression in the cover 130.

An alternative embodiment of an adapter 200 is illustrated in FIGS. 9-12. In this embodiment, the main body 202 is a standard connector adapter, but the cover 240 is connected to the main body 202 by a clip 250. The clip 250 and the cover 240 are rotatably coupled to one another by a pin 232, with a resilient member 260 biasing the cover 240 toward the main body 202. In this manner, the adapter 200 may be added to already installed adapters, preventing the need to reinstall adapters and connectors in already existing systems. The adapter 200 also includes a gasket 242 that assists in maintaining a seal for the adapter 200. The gasket 232 is preferably sized to correspond to the configuration of the main body 202 of the adapter 200 (as well as the cover 240).

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A fiber optic connector adapter comprising:
a main body having an opening for receiving a fiber optic connector;
a cover for sealing the opening in the main body when a connector is not inserted into the opening, the cover being rotatedly connected to the main body; and
a single resilient member engaging the main body and the cover to bias the cover in a closed position, the single resilient member engaging the cover at a single location that generally corresponds to a center portion of the cover.

2. The fiber optic connector adapter according to claim 1, wherein the main body has an end face and a projection on the end face extending around the opening.

3. The fiber optic connector adapter according to claim 2, the cover having a recessed area corresponding to the radial projection on the end face of the main body, the recessed area having a flexible member to engage the radial projection and seal the opening.

4. The fiber optic connector adapter according to claim 1, wherein the cover has an opening therein to receive the resilient member.

5. The fiber optic connector adapter according to claim 1, further comprising a pin to attach the cover to the main body, the pin being disposed in a pin opening in both the cover and the main body, the pin opening in the cover being noncircular.

6. The fiber optic connector adapter according to claim 1, wherein the cover is made of metal.

7. The fiber optic connector adapter according to claim 6, wherein the cover is attached to a clip that attaches to the main body.

8. The fiber optic connector adapter according to claim 1, wherein the resilient member is a spring arm.

9. A fiber optic connector adapter comprising:
a main body having an opening for receiving a fiber optic connector;
a cover for sealing the opening in the main body when a connector is not inserted into the opening, the cover being rotatably connected to the main body and having a recessed area having a flexible member disposed therein to engage the main body and seal the opening; and
a single resilient member engaging the main body and the cover to bias the cover in a closed position, the single resilient member engaging the cover at a single location.

10. The fiber optic connector adapter according to claim 9, wherein the resilient member engaging the cover only at a location that generally corresponds to a center portion of the cover.

11. The fiber optic connector adapter according to claim 9, the main body having an end face and a radial projection on the end face extending around the opening and generally corresponding to the recessed area, the flexible member disposed to engage the radial projection and seal the opening.

12. The fiber optic connector adapter according to claim 9, wherein the cover has an opening therein to receive the resilient member.

13. The fiber optic connector adapter according to claim 9, further comprising a pin to attach the cover to the main body, the pin being disposed in a pin opening in both the cover and the main body, the pin opening in the cover being noncircular.

14. The fiber optic connector adapter according to claim 9, wherein the resilient member is a spring arm.

15. A fiber optic connector adapter comprising:
a main body having an opening for receiving a fiber optic connector, the main body having an end face and a radial projection on the end face extending around the opening;
a cover for sealing the opening in the main body when a connector is not inserted into the opening, the cover being rotatedly connected to the main body and having a recessed area corresponding to the radial projection on the end face of the main body, the recessed area having a flexible member to engage the radial projection and seal the opening; and
a resilient member engaging the main body and the cover to bias the cover in a closed position, the resilient member engaging the cover only at a location that generally corresponds to a center portion of the cover.

16. A fiber optic connector adapter comprising:
a main body having an opening for receiving a fiber optic connector;
a cover for sealing the opening in the main body when a connector is not inserted into the opening, the cover being rotatably connected to the main body;
a flexible member engaging the main body and the cover when the connector is not inserted into the opening to thereby seal the opening; and
a single resilient member engaging the main body and the cover to bias the cover in a closed position, the single resilient member engaging the cover at a single location.

* * * * *